United States Patent [19]
Yan et al.

[11] Patent Number: 5,749,819
[45] Date of Patent: May 12, 1998

[54] AUTOMATIC TOOL CHANGING APPARATUS

[75] Inventors: Hong-Sen Yan; Wen-Miin Hwang; Fu-Chen Chen, all of Tainan; Philine Huang; Yang-Sheng Fan, both of Taichung, all of Taiwan

[73] Assignee: National Science Council, Taipei, Taiwan

[21] Appl. No.: 663,971

[22] Filed: Jun. 14, 1996

[51] Int. Cl.⁶ ................................................. B23Q 3/157
[52] U.S. Cl. ............................................. 483/39; 483/44
[58] Field of Search ................................ 483/38, 39, 40, 483/41, 42, 43, 44, 47

[56] References Cited

U.S. PATENT DOCUMENTS

| | | |
|---|---|---|
| 4,546,532 | 10/1985 | Kitamura. |
| 4,557,035 | 12/1985 | Rutschle. |
| 4,773,152 | 9/1988 | Kitamura. |
| 4,833,772 | 5/1989 | Kobayashi et al. ............ 483/44 |
| 5,081,762 | 1/1992 | Kin .................................... 483/44 |

FOREIGN PATENT DOCUMENTS

| | | | |
|---|---|---|---|
| 3503637 | 8/1986 | Germany | 483/47 |
| 34043 | 2/1988 | Japan | 483/39 |
| 52946 | 3/1988 | Japan | 483/39 |
| 92239 | 4/1991 | Japan | 483/39 |

Primary Examiner—William R. Briggs
Attorney, Agent, or Firm—Beveridge, DeGrandi, Weilacher & Young, LLP

[57] ABSTRACT

An automatic tool changer in a machining enter includes a reducer, a compound cam, a cylindrical cam, a four-bar mechanism, a toggle mechanism, and a tool cahnge device. The compound cam and the cylindrical cam are driven by a motor after speed reduction through a belt and gear train. The compound cam includes a roller gear cam and a face cam performs the tool change motions. During the tool change motions, the cylindrical cam drives the crank of the toggle mechanism to make the slider push the drawback which produces the pushing and pulling tool motions in the spindle head. By way of using this design, the tool change time is largely reduced, the tool change motions are more smooth, and the cost can be cheaper than the previous design.

7 Claims, 7 Drawing Sheets

Fig. 1

PRIOR ART

AUTOMATIC TOOL CHANGING APPARATUS

UTILIZATION FIELD IN INDUSTRY

This invention relates to an automatic tool changer in a machining center whereby in tool changing, the motion is smoother, the speed faster and the cost lower, particularly to an automatic tool changer which proceeds a changing of the new and old tools on the tool magazine and the spindle to meet the different machining requirements.

Figure 1:
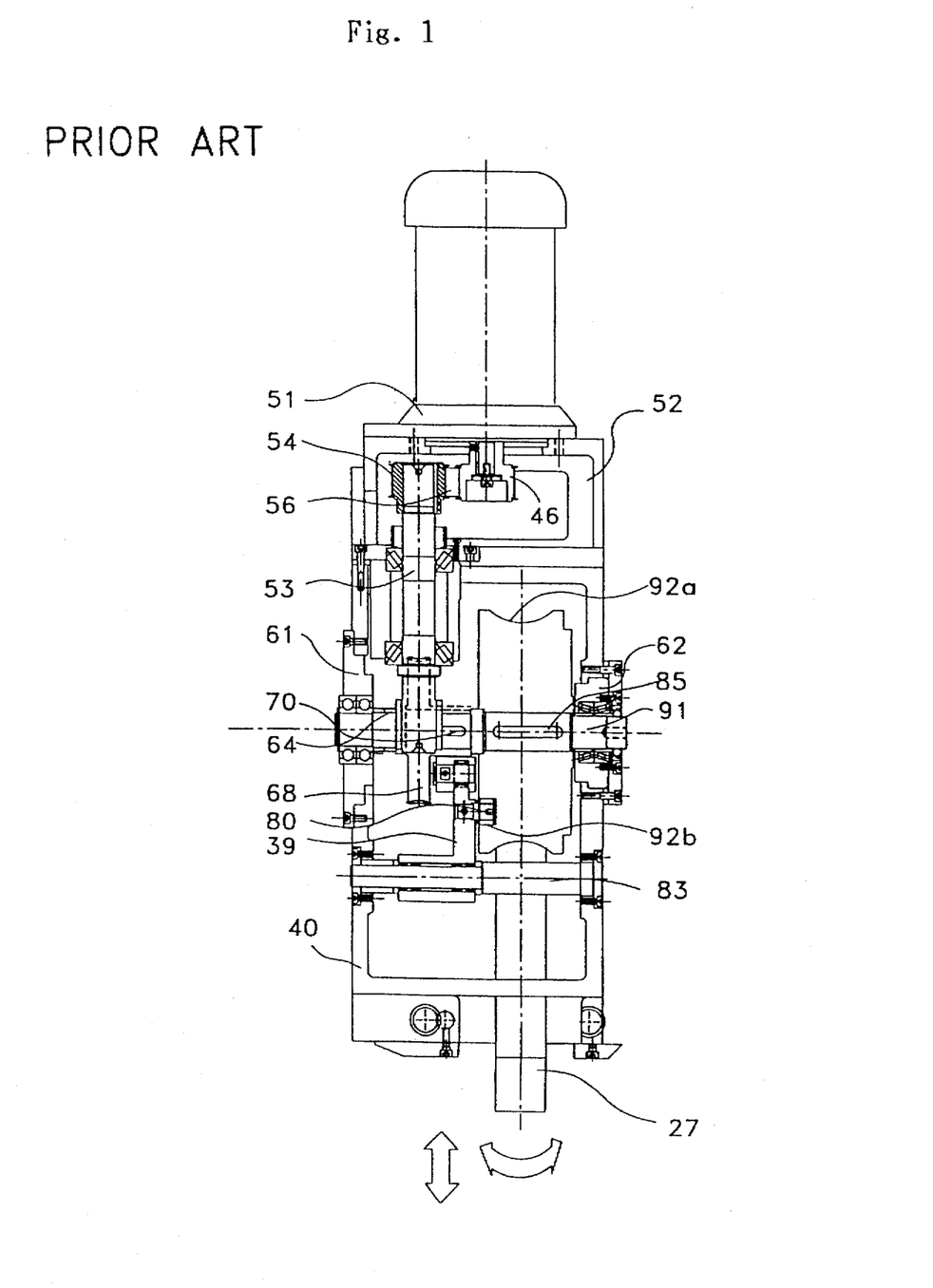
FIG. 1 is a side view of the conventional tool changing mechanism.
Figure 2:
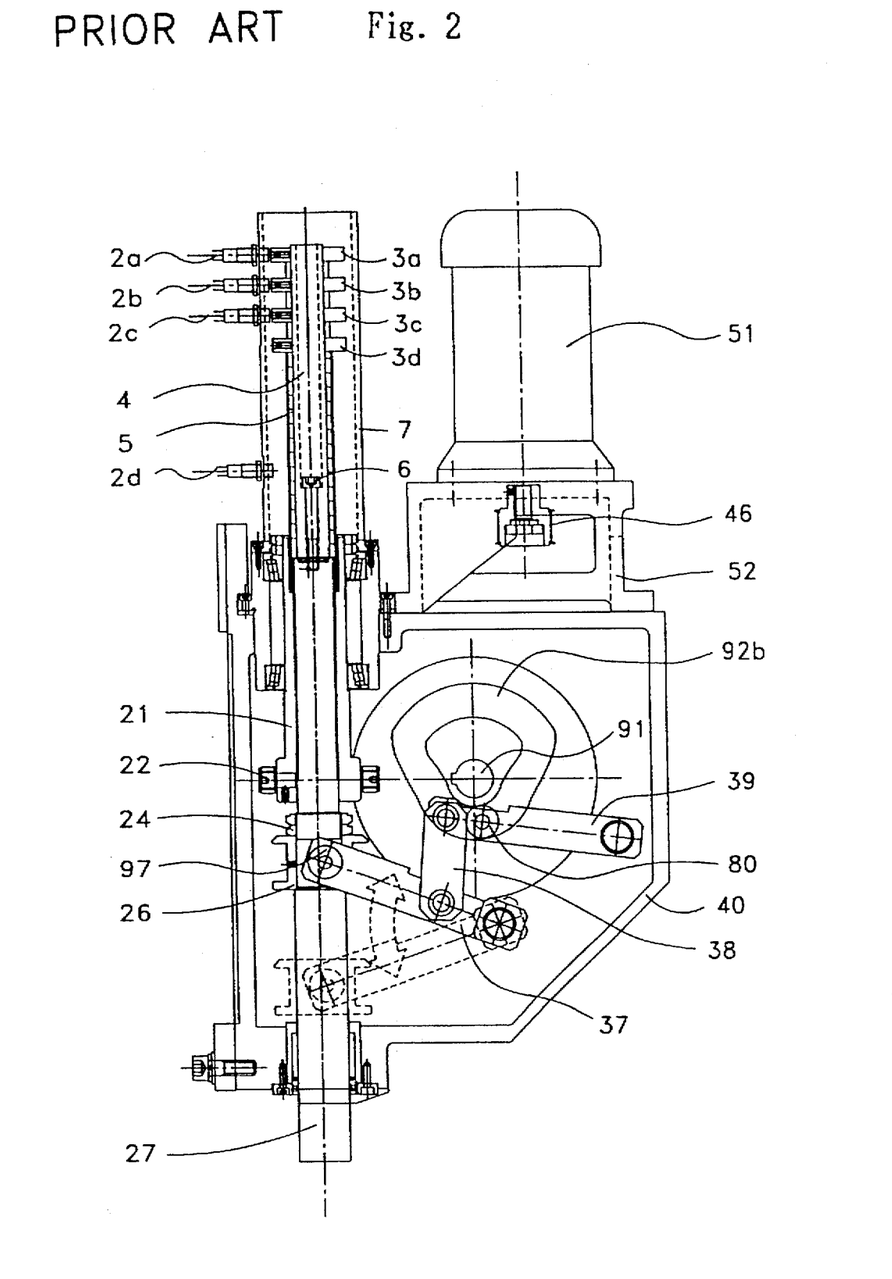
FIG. 2 is a front view of the conventional tool changing mechanism (that is a front view of the face cam and four-bar mechanism)
Figure 3:
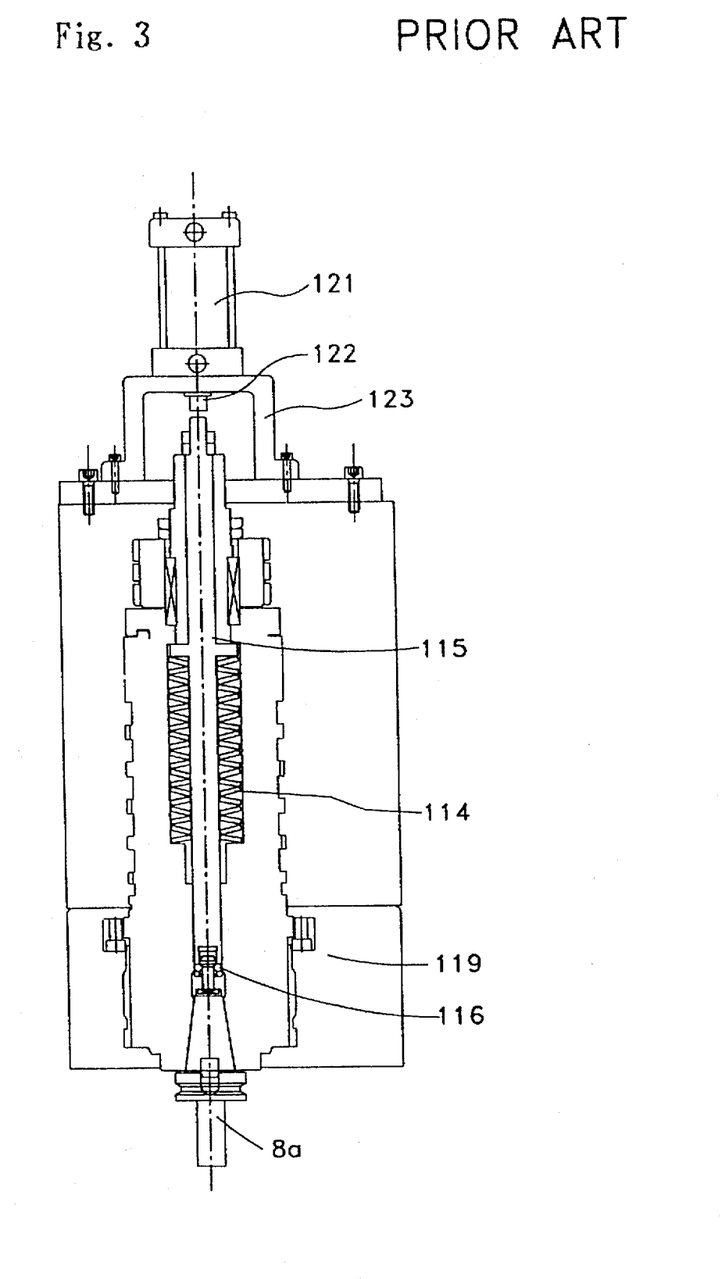
FIG. 3 schematically shows the pushing tool and pulling tool of the conventional spindle.

As shown in FIGS. 1, 2 and 3, the existing design relates to an automatic tool changing apparatus of the machine tool. The motion of the tool changing arm is completed in a driven way by means of a roller gear cam 92a and a face cam 92b, and during the motion of the tool changing arm the sensing device 2a, 2b, 2c and 2d are applied to detect the position of the tool changing arm whereby the actuation and stop of the motor 51 and the motion of the oil compressing cylinder 121 are controlled for the drawbar 115 of the spindle to proceed the releasing or pulling of the tool in the spindle head, i.e. the so called tool pushing and tool pulling. Such kind of design is advantageous in that the construction is simple; the oil compressing cylinder may generate a great force to drive the drawbar to push and pull tool; and the tool changing arm is allowed to continue the next motion after the detection of the sensing device. As a result of which the situation that the tool changing arm pulls out the tool when the draw bar of the spindle has not yet released the tool will not occur. However, this design is still not ideal. It results in the defects that in the process of the tool changing, the sensing device have to at first detect the position of the tool changing arm and if the motion of tool pushing and tool pulling have completed, and then renew the motion of the motor. The possible looseness of the parts of the sensing device will fail to send a correct signal, as a result of which the tool changing mechanism will not operate normally and the greater torque required for starting the motor will render the motion not smooth, elongate excessively the tool changing time, i.e., increase the required time not for cutting, and the productivity of the total machine tool will then lower down. Furthermore, the drawbar of the spindle could not be driven by the motor and requires to separately provide an independent oil compressing unit. It occupies a lot of space and renders the cost higher. Thus, the needs of the small volume, low cost and quick tool changing motion in the present automatic tool changing mechanism of the machine tool could not be satisfied.

THE PROBLEMS TO BE SOLVED BY THIS INVENTION

In view that the conventional tool changing process is not ideal, the motor has to be started again during tool changing, the torque for starting the motor is greater, the motion is not smooth, the time for changing tool is too long, the productivity of the whole machining is lowered, and the drawbar of the spindle could not be driven by the motor as a result of which an independent oil compressing unit requires to be separately provided, one object of this invention is to provide an automatic tool changing apparatus of the machine tool which changes the new and old tools in the tool magazine and the spindle head to meet different machining requirements.

The other object of this invention is to apply a compound cam to drive the spline and spline shaft to control the tool changing arm in the changing tool, and a cylindrical cam to drive a toggle mechanism whereby during tool changing, the motion of the pushing tool and pulling tool is smoother, the speed of tool changing quicker and the cost lower, and furthermore the defect that the looseness of the sensing devices fails to correctly detect and causes the automatic tool changing mechanism not able to operate normally is obviated.

MEANS UTILIZED TO SOLVE THE PROBLEM

To accomplish the above objects, an automatic tool changing mechanism according to this invention is mainly characterized in comprising a tool changing device, a compound cam, a four-bar mechanism, a cylindrical cam, a toggle mechanism and a reducer. A power source through the belt and reducer drives the compound cam and cylindrical cam which further drive the tool changing mechanism. The compound cam may drive the tool changing mechanism whereby the rotation and axial motion of the tool changing arm may sequentially be controlled at the same time for the tool changing apparatus to accomplish the motions such as grasping tool, extracting tool changing tool, inserting tool and releasing tool. The cylindrical cam may drive the toggle mechanism to sequentially control the drawbar of the spindle so that the drawbar of the spindle may move axially to accomplish the motions such as pushing tool and pulling tool.

This invention is mainly characterized in comprising: a tool changing mechanism wherein a spline shaft is securely connected to a tool changing arm which is pivotally connected to the machine body, and the spline shaft is provided with a guiding wheel on the outer circumference and further the spline is securely connected to a driven roller group and being connected to the spline shaft whereby they are opposite to each other and move axially.

A compound cam including a roller gear cam and a face cam, the circumference of the roller gear cam having a plurality of traits of open curve in engagement with the driven roller group conjugately on the spline to drive the spline and spline shaft to rotate reciprocally, the face cam being provided with a trait of close curve to drive the driven parts to oscillate reciprocally; a four-bar mechanism wherein the driven parts of the face cam function as a crank one end of which is pivoted to the machine body and the other end of which is connected to a connected rod for transmitting the displacement of the face cam through the connecting rod to a oscillating arm whereby the spline shaft is driven to move axially;

a cylindrical cam driven by a sprocket wheel and a chain, the end face of the cylindrical cam being provided with a trait of closed curve in engagement with the roller of the driven parts to drive the driven parts to oscillate reciprocally whereby a particular time sequence relationship is formed between the curve of the cylindrical cam and that of the compound cam;

a toggle mechanism wherein the output driven parts of the cylindrical cam function is the crank of the toggle mechanism whereby the crank reciprocates to drive the connecting rod for the slider to push the drawbar of the spindle to push and pull tool; and a reducer which is provided between the power source and the cam shaft, the reducer being formed by a gear group whereby said mechanism reduces the input speed of the power source and changes the rotating direction thereof during input to drive the compound cam and cylindrical cam.

By means of the above construction, the compound cam drives the spline and spline shaft to rotate and move axially whereby the tool changing arm is controlled to proceed the tool changing motion; and the cylindrical cam actuates the toggle mechanism to drive the drawbar of the spindle to move axially whereby the clamping and releasing of the tools of the spindle is controlled.

For the design of this invention allows to save the oil compressing unit of the conventional art, the cost is lower. The tool changing motions such as grasping tool, pushing tool, extracting tool, interchanging tool, inserting tool, pulling tool, and releasing tool are driven by the motor and controlled by means of the suitably designed curve of the cam, therefore, the tool changing motion may be very quick and accurate. For the motor needs not stop to detect the motion of pushing tool and pulling tool during pulling tool and then rotate, the movement property of the whole tool changing mechanism is better and the motion thereof is smoother.

The objects and advantages of the present invention will become more apparent from the following detailed description and preferred embodiments when read in connection with the accompanying drawings, in which;

REFERENCE NUMBER OF THE ATTACHED DRAWINGS 2a, 2b, 2c, 2d. . . sensing device
3a, 3b, 3c, 3d. . . induction wheel
4 . . . induction shaft of sensing device
5 . . . precompression spring
8a. . . old tool
8b. . . new tool
21 . . . spline
22 . . . roller group
24 . . . fixed
26 . . . guiding wheel
27 . . . spline shaft
28 . . . tool changing arm
37 . . . oscillating arm
38 . . . connecting rod
39 . . . driven parts
40 . . . machine body
46 . . . belt wheel
51 . . . motor
52 . . . bottom seat of the motor
53 . . . worm shaft
54 . . . belt wheel
56 . . . belt
61 . . . left edge cover of the machine body
62 . . . right edge cover of the machine body
64 . . . spacer
68 . . . worm
70 . . . key
71a. . . sprocket wheel
71b. . . sprocket wheel
73 . . . cylindrical cam
74 . . . chain
80 . . . driving roller
83 . . . shaft
85 . . . key
91 . . . driving shaft
92 . . . compound cam
92a. . . roller gear cam
92b. . . face cam
97 . . . roller
101 . . . cylindrical cam
102 . . . roller
103 . . . crank
104 . . . connecting rod
105 . . . slider
106 . . . slider axis
107 . . . spring
108 . . . machining body
114 . . . Belleville spring
115 . . . drawbar of spindle
116 . . . steel ball
119 . . . spindle
121 . . . oil compressing cylinder
122 . . . output shaft of oil compressing cylinder
123 . . . bottom seat of oil compressing cylinder According to an automatic tool changing apparatus of this invention as shown from FIG. 4 to 7, a motor 51 drives a belt wheel 46. The driving force transmitted to a worm shaft 53 on a belt wheel 54 through a belt 56 allows worm shaft 53 to drive in a worm gear 68 to rotate. The worm gear 68, compound cam 92 and sprocket wheel 71 are on the same axis. The worm gear 68 is secured on a driving shaft 91 of the compound cam by means of a key 70. The compound cam 92 formed by a roller gear cam 92a and a face cam 92b is secured on a driving shaft 91. The circumference of the roller gear cam 92a is provided with a trait of open curve to engage with a roller group 22 conjugately on a spline 21 whereby the spline 21 and a spline shaft 27 are driven to rotate. The face cam 92b is provided with a closed curve to drive a roller 80 which further drives parts 39 to oscillate reciprocally.

Figure 4:
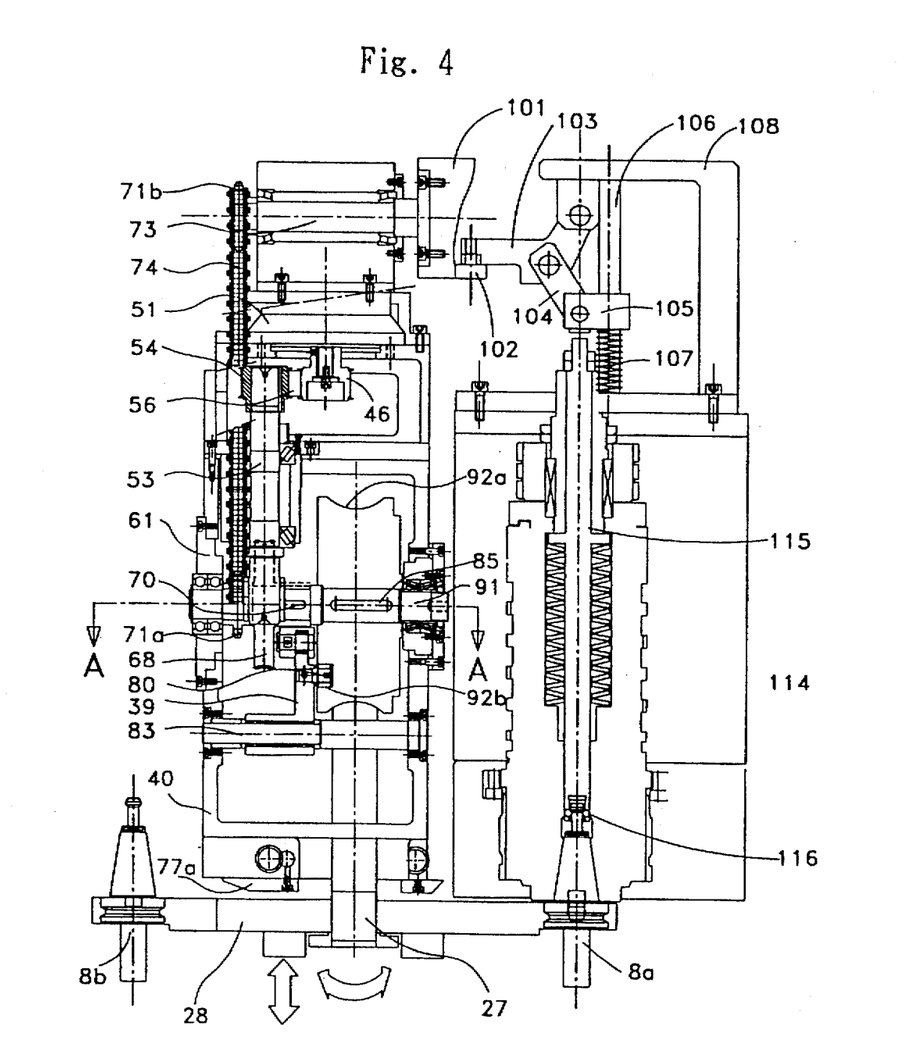
FIG. 4 is a front view of an automatic tool changing mechanism according to this invention.
Figure 5:
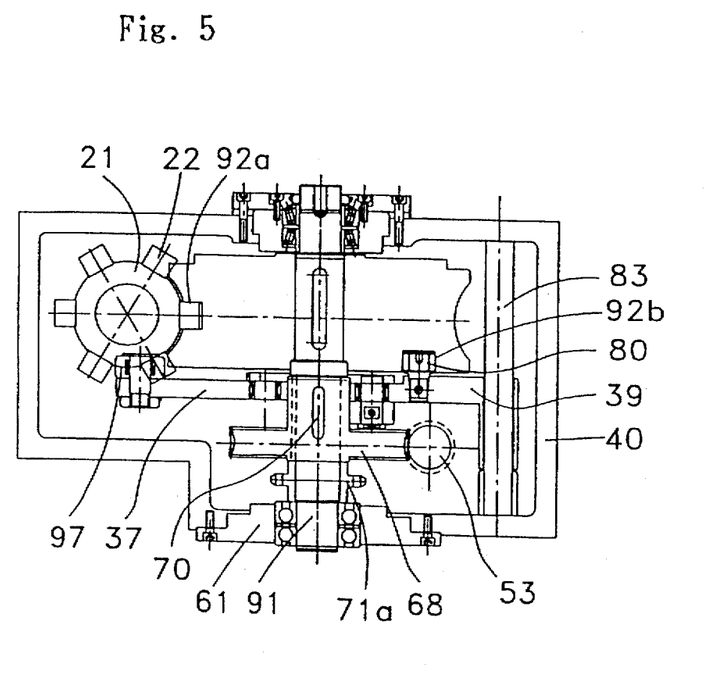
FIG. 5 is a sectional view along A—A line of the front view of an automatic tool changing mechanism according to this invention.

The driven parts 39 of the face cam 92b rotates around the shaft 83 securredly connected to a machine body 40. The driven parts 39 function as the crank of a four-bar mechanism. One end of connecting rod 38 is connected to the end point of the crank while the other end of the connecting rod 38 is connected to the oscillating arm 37 whereby the oscillating motion of the driven parts is enlarged through the connecting rod 38 and transmitted to the oscillating arm 37. One end of the oscillating arm 37 is pivotally connected to the machine body 40, the intermediate portion of the oscillating arm 37 is connected to the connecting rod 38, while the other end of the oscillating arm 37 is pivoted to a roller 97 and a guiding wheel 26 so that after the oscillating motion of the driven parts 39 of the face cam 92b is enlarged, the guiding wheel 26 is driven by the roller to move reciprocally. Both the spline 21 and spline shaft 27 are pivotally connected to the machine body 40 of the tool changing mechanism. On the circumference of the spline shaft 27 is securely provided with the guiding wheel 26. After the guiding wheel 26 is driven by the oscillating arm 37, the spline shaft 27 will be driven to move axially in relative to the machine body 40 and spline at the same time to generate the motions such as extracting tool and inserting tool during tool changing. The spline shaft 27 is connected to the tool changing arm 28. And, after the roller group 22 on the spline 21 is driven by the roller gear cam 92a, the spline 21 and spline shaft 27 will be driven to rotate to generate the motions such as grasping tool 8b, interchanging tool and releasing tool during tool changing. The sprocket wheel 71a transmits the rotation of the driving shaft 91 of the compound cam 91 to the cylindrical cam shaft 73 through the chain 74 and the sprocket wheel 71b. A cylindrical cam 101 is secured on the cylindrical cam shaft 73. On the end face of the cylindrical cam 101 there is provided a trait of closed curve in engagement with a roller 102 on a crank 103 of the toggle mechanism so that the roller 102 is driven to allow the crank 103 to oscillate reciprocally.

Figure 6:
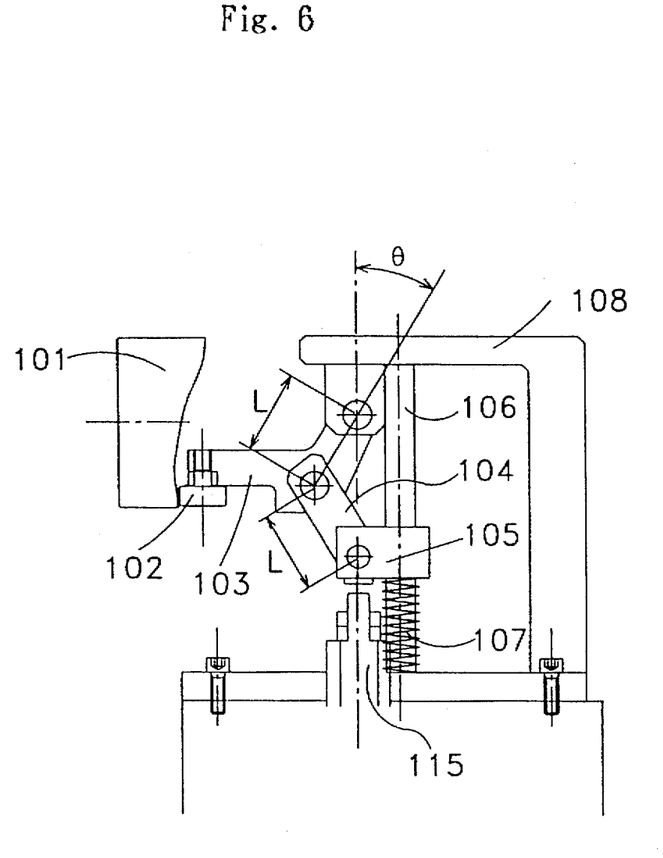
FIG. 6 is a front view of a toggle mechanism utilized by an automatic tool changing mechanism according to this invention.
Figure 7:
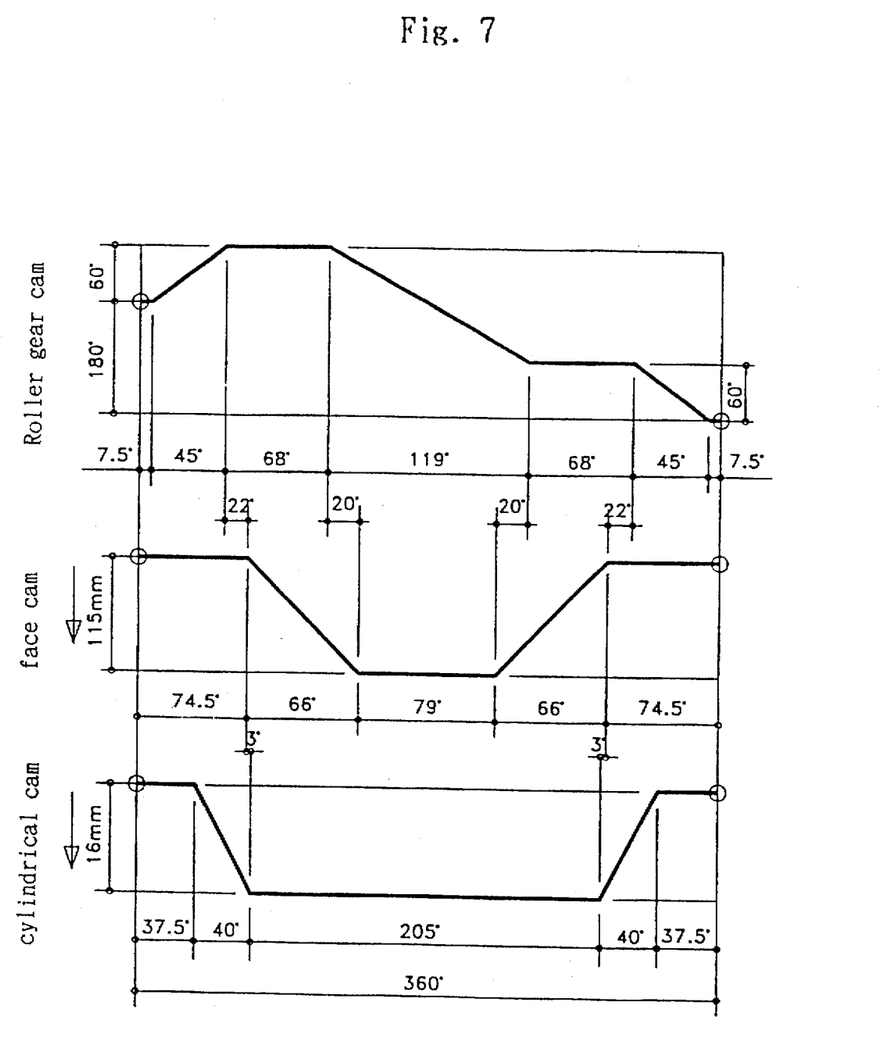
FIG. 7 is the follower displacement chart of the cams of an automatic tool changing mechanism according to this invention.

One end of the crank 103 is pivotally connected to a machine body 108 and the other end of the crank 103 is securedly connected to the roller 102 while the middle portion of the crank 103 is connected to a connecting rod 104 whereby the oscillating motion of the crank 103 is transmitted to a slider 105 which compresses a spring 107 downward and pushes the drawbar of the spindle 115, and the drawbar of the spindle 115 compresses a belleville spring 114 to allow steel balls 116 on the bottom end of the drawbar of spindle 115 in a spindle head 119 to move outwardly and then release to accomplish the motion of pushing tool for an old tool to be pulled out. When a new tool 8b is inserted inside the spindle head 119, the recovering force of the belleville spring 114 and the spring 107 will combine to pull the drawbar 115 to clamp the new tool to accomplish the motion of pulling tool, and push the slider 105 to allow the roller 102 on the crank 103 to engage with the cylindrical cam 101 respectively. In application of the property that the toggle mechanism may enlarge the input force, assuming the force to push the roller of the crank as F, both the length of the crank and that of the connecting rod as L, and the angle between crank and the perpendicular line as θ, a force P will be generated from the slider as $$P = \frac{F}{2\tan\theta}$$

According to the main feature of this invention, if θ is very small, P will be far greater than F to satisfy the required great force for pushing the pulling bar of spindle to compress the belleville spring.

In comparison with the conventional machine this invention is smoother in motion, quicker in changing tool and lower in cost. It greatly improves the defects that the long tool change time and high cost for changing tool caused by the detection of the sensing device and the pushing tool and the pulling tool of the oil compressing unit as found in conventional art. The above embodiments is described with a view alone that the roller of the crank is perpendicular to the ground. However, it is understood that in practical use, the roller may be horizontally secured to the crank. It means that the varied design wherein the movement axis of the roller and that of the crank is parellel to each other may also satisfy the requirements of the original design, and should fall within the scope of the claims of this invention.

We claim:

1. An automatic tool changing apparatus connected to a power source within a machine body, said automatic tool changing apparatus comprising:

a reducer connected to the power source for adjusting a speed provided by the power source and for altering an axis of rotation provided by the power source, a driving shaft connected to said reducer, said reducer rotating said driving shaft, a compound cam rotationally driven by said driving shaft, a four-bar mechanism connected to said compound cam, whereby said compound cam provides oscillation movement to said four-bar mechanism, a spline pivotally connected to the machine body and rotationally connected to said compound cam, a spline shaft pivotally connected to the machine body and axially driven by said four-bar mechanism, a tool changing arm connected to said spline and said spline shaft, said spline rotating said tool changing arm, said spline shaft axially moving said tool changing arm, a cylindrical cam driven by said reducer, a toggle mechanism driven by said cylindrical cam to oscillate, a draw bar axially driven by said toggle mechanism, and a spindle head attached to said draw bar for grabbing and holding a tool.

2. An automatic tool changing apparatus as claimed in claim 1, wherein said reducer includes:

a belt wheel group driven by the power source, a sprocket wheel group connected to said compound cam through said driving shaft and connected to said cylindrical cam, said sprocket wheel group transfers the rotation of said compound cam to said cylindrical cam, a worm shaft said belt wheel group rotates said worm shaft, and a worm gear group driven by said worm shaft to drive said compound cam.

3. An automatic tool changing apparatus as claimed in claim 1, wherein said compound cam includes:

a roller gear cam, said roller gear cam having a plurality of rollers for moving said spline connected to said tool changing arm, and a face cam, said face cam drives said four-bar mechanism.

4. An automatic tool changing apparatus as claimed in claim 1, wherein said four-bar mechanism includes:

driven parts, said compound cam driving said driven parts to oscillate, a connecting rod connected to said driven parts, said connecting rod amplifies the oscillating motion of said driven parts, an oscillating arm connected to said connecting rod, and a machine body pivotally connected to said driven parts and pivotally connected to said oscillating arm; and whereby oscillating motion in said driven parts is transferred to said oscillating arm through said connecting rod, said oscillating arm axially drives said spline shaft.

5. An automatic tool changing apparatus as claimed in claim 1, wherein said toggle mechanism includes:

a roller engaging said cylindrical cam, a crank connected to said roller, a connecting rod connected to said crank, and a slider connected to said connecting rod and said drawbar; and whereby said roller is driven by said cylindrical cam to provide a reciprocal movement to said crank which in turn moves said slider.

6. An automatic tool changing apparatus as claimed in claim 1 further comprising:

a belleville spring around said drawbar, and a plurality of steel balls at a bottom end of said drawbar in said spindle head to grasp the tool;

whereby after a new tool is inserted, the belleville spring pulls said drawbar to clamp the new tool.

7. An automatic tool changing apparatus connected to a power source within a machine body, said automatic tool changing apparatus comprising:

a reducer connected to the power source for adjusting a speed provided by the power source and for altering an axis of rotation provided by the power source, a compound cam driven by said reducer, a four-bar mechanism driven by said compound cam, a spline connected to said compound cam and connected to said four-bar mechanism, a tool changing arm connected to said spline, a cylindrical cam driven by said reducer, a toggle mechanism driven by said cylindrical cam, and a drawbar connected to said toggle mechanism;

whereby said compound cam provides axial rotation to said spline, said four-bar mechanism vertically moves said spline, said spline transfers said movement to said tool changing arm, and said drawbar removes a tool from said tool changing arm.

* * * * *